US005441683A

United States Patent [19]

Kammerer et al.

[11] Patent Number: 5,441,683

[45] Date of Patent: Aug. 15, 1995

[54] SIMPLIFIED PROCESS FOR THE PRODUCTION OF CARBON MOTOR BRUSHES

[75] Inventors: Eric Kammerer; Christine Lietard; Jean-Bernard Deboves, all of Amiens, France

[73] Assignee: Le Carbone Lorraine, Courbevoie, France

[21] Appl. No.: 251,183

[22] Filed: May 31, 1994

[30] Foreign Application Priority Data

Jun. 4, 1993 [FR] France .......... 93 06962

[51] Int. Cl.[6] .......... C04B 35/00

[52] U.S. Cl. .......... 264/105

[58] Field of Search .......... 264/105

[56] References Cited

U.S. PATENT DOCUMENTS 2,066,176 12/1936 Girvin et al. .

2,823,147 2/1958 Ward, Jr. .......... 264/105

2,855,630 10/1958 Veley .......... 264/105

3,510,710 5/1970 McCafferty .......... 264/105

3,601,645 8/1971 Whiteheart

FOREIGN PATENT DOCUMENTS 212666 3/1987 European Pat. Off. .

1403497 8/1975 United Kingdom .

*Primary Examiner*—Christopher A. Fiorilla

*Attorney, Agent, or Firm*—Dennison, Meserole, Pollack & Scheiner

[57] ABSTRACT

A process for producing a brush for an electric motor having predetermined final dimensions and including a wearing block and a connecting braid. The brush is produced by preparing at least one mixture including a conductive graphite powder in the form of solid particles of a mean thickness less than 25 μm and a mean shape factor greater than 5, encased with a distillation binder. The mixture is molded together with the connecting braid in a mold to form a crude brush of the final dimensions and the crude brush is baked.

17 Claims, 5 Drawing Sheets

SIMPLIFIED PROCESS FOR THE PRODUCTION OF CARBON MOTOR BRUSHES

FIELD OF THE INVENTION

The invention concerns the field of brushes intended to provide for electrical contact between the movable parts (collectors) and the fixed parts of an electric motor.

DESCRIPTION OF RELATED ART

A brush typically comprises two parts: an electrically conductive wearing block which rubs against the collector of a motor and a metallic connecting braid (or cable).

In general production of brushes comprises the following steps:

a) preparation of at least one mixture of powders comprising conductive powders (electrical conduction), typically powders containing carbonaceous and/or metallic solid particles, the powders being mixed with binders which are solid at ambient temperature or encased with binders, typically tars, pitches or synthetic resins, b) shaping a rough brush by molding and compression of said mixture of powders in a molding of the appropriate shape, c) baking of the rough brush, and d) trimming to the final size by machining.

Fixing of the conductive braid (or cable), generally of copper, can be effected in different ways:

either in molding step b), by introducing the braid into the mold prior to compression, so as to use the compression effect to anchor the braid in the mixture of powders, or in step d) in which the braid is anchored either by machining a hole in the wearing block or by brazing the braid to the wearing block, the block comprising a metal layer, or finally by riveting the braid and the wearing block.

Brushes are also known in which the wearing block is a multi-layer block, that is to say the wearing block comprises layers, which are fixed relative to each other, of materials of different natures. French patent FR 2 009 196 describes a typical example of a multi-layer brush.

One problem of the brushes of the prior art is their relatively high production cost.

In particular machining step d) is expensive on at least two counts, on the one hand it constitutes in itself a phase which consumes labor and industrial means ( machines, premises . . . ), and that corresponds to not inconsiderable levels of capital investment and operating costs, and on the other hand, it gives rise to machining wastage which on the one hand increases the material cost of the brushes and which on the other hand constitutes a source of solid rejects and the processing thereof involves additional cost.

It is known moreover that fixing the connecting braid is mere expensive by machining brazing the wearing block rather than by introducing it into the mold in step b).

Finally, it is known that synthetic binders, for example phenolic resins, give rise to more difficulties than binders of the coal or petroleum pitch type, tars (mixtures of pitches and oils), all being products which result from the fractional distillation of coal or petroleum.

In total, in consequence of the cost analysis operations carried out, the applicants sought means to be used to produce a brush directly in the final dimensions (therefore without machining), with incorporation of braid in the mold and using an inexpensive binder, in particular a distillation binder (in contrast to a synthetic binder).

SUMMARY OF THE INVENTION

According to the invention the process for the production of a brush for an electric motor comprising a wearing block and a connecting braid comprises a step a) for preparation of at least one mixture of powder comprising at least one conductive powder encased with a binder, a step b) for moulding by compression of the mixture or mixtures in a mould with the incorporation of said braid to fore a rough brush, and a step c) for baking said rough brush, and it is characterised in that, in order to produce an economic brush by molding directly in the final dimensions, in step a) there is prepared at least one mixture M1 comprising a distillation binder L and at least one powder P1 of graphite in the fore of solid particles of a mean thickness of less than 25 μm and with a high mean shape factor F1 (ratio of large dimension/small dimension)which is higher than 5.

It is known to the man skilled in the art that compression of powders gives rise to stresses and that, in the baking operation, a softening effect occurs as an intermediate condition, which finally results in substantial degrees of deformation which require machining of the brushes after baking.

To limit such deformation phenomena, particular methods are already known for producing brushes which are substantially of the final dimensions, at the end of the baking operation. Among such methods mention may be made of the incorporation of sulphur in a distillation binder (pitch or tar) or the use of a thermosetting synthetic binder.

Now, those two methods are to be disregarded if an inexpensive brush is to be produced.

In fact, the use of sulphur does not permit the introduction of a copper braid prior to baking (in the moulding operation) because the sulphur attacks the copper braid during the baking step. As already mentioned moreover it is not possible to envisage fixing a copper braid to a wearing block in the machining operation, as that procedure is not an economical one. As regards the use of a thermosetting synthetic resin, this cannot be used to produce the wearing block of an inexpensive brush as its cost is about ten times higher than that of a distillation binder.

The applicants therefore looked for other ways for directly obtaining after baking brushes of the final dimensions, using inexpensive binders (binders produced by the distillation of coal or petroleum), and with the copper braid being introduced in the compression moulding step.

The solution that the applicants found and which makes it possible to produce directly at the end of the baking operation brushes which are of the definitive dimensions ready to be delivered is therefore characterised by the essential presence of a graphite powder which involves both a high degree of slenderness, that is to say a high shape factor F1, and a relatively low mean thickness.

The applicants found that if the degree of slenderness were excessively low or if the mean thickness were excessively high, then the operation of baking the rough brush resulted in levels of deformation which were too high to be able to use the baked brushes as such, without additional machining.

At this time the research carried out by the applicants has not made it possible to establish with certainty the reasons why the use of a distillation binder and particular graphite powders according to the invention permitted baking without considerable deformation.

The expression "without considerable deformation" means that the minimal deformation phenomena which can occur during the baking operation remain within the tolerances in respect of the dimensions of the brushes (see the standards CEI 136 (C) (1986)-DIN 43000 (1973)-AFNOR C 51902 (1968)). Those standards are set out in a simplified form in technical notice STA AE 16-4 F which is edited by the present applicants. By way of example, for a nominal value (or a theoretical value for "t" and "a" as the brush must be of a smaller section than that of the brush carrier) of 10 mm, the tolerances in respect of the different standardised dimensions on the 3 axes "t", "a" and "r" are as follows:

in respect of "t": from 10−0.03 mm to 10−0.11 mm
in respect of "a": from 10−0.03 mm to 10−0.11 mm
in respect of "r": 10±0.3 mm Those dimensions are shown in FIGS. 1*a* and 1*b*. In this patent application the "height" of a brush corresponds to the direction of "r".

The man skilled in the art is also aware that not all the deformation phenomena which occur during the baking operation are equally critical or seriously unacceptable. The man skilled in the art is afraid above all, besides cracking of the brush during the baking operation, either of random deformation phenomena (he is therefore looking for reproducible production conditions), or deformation phenomena corresponding to curvature of the brush, which would therefore make it useless. In contrast, homothetic deformation—reproducible deformation—during baking does not in itself constitute a deformation such as to give rise to a problem insofar as, following preliminary tests, the man skilled in the art can introduce reproducible homothetic deformation into the design of the brush and into the process for the production thereof.

The means described in the present application provide a response to the problem of deformation phenomena which trouble the man skilled in the art.

DESCRIPTION OF THE PREFERRED EMBODIMENTS

Figure 1A:
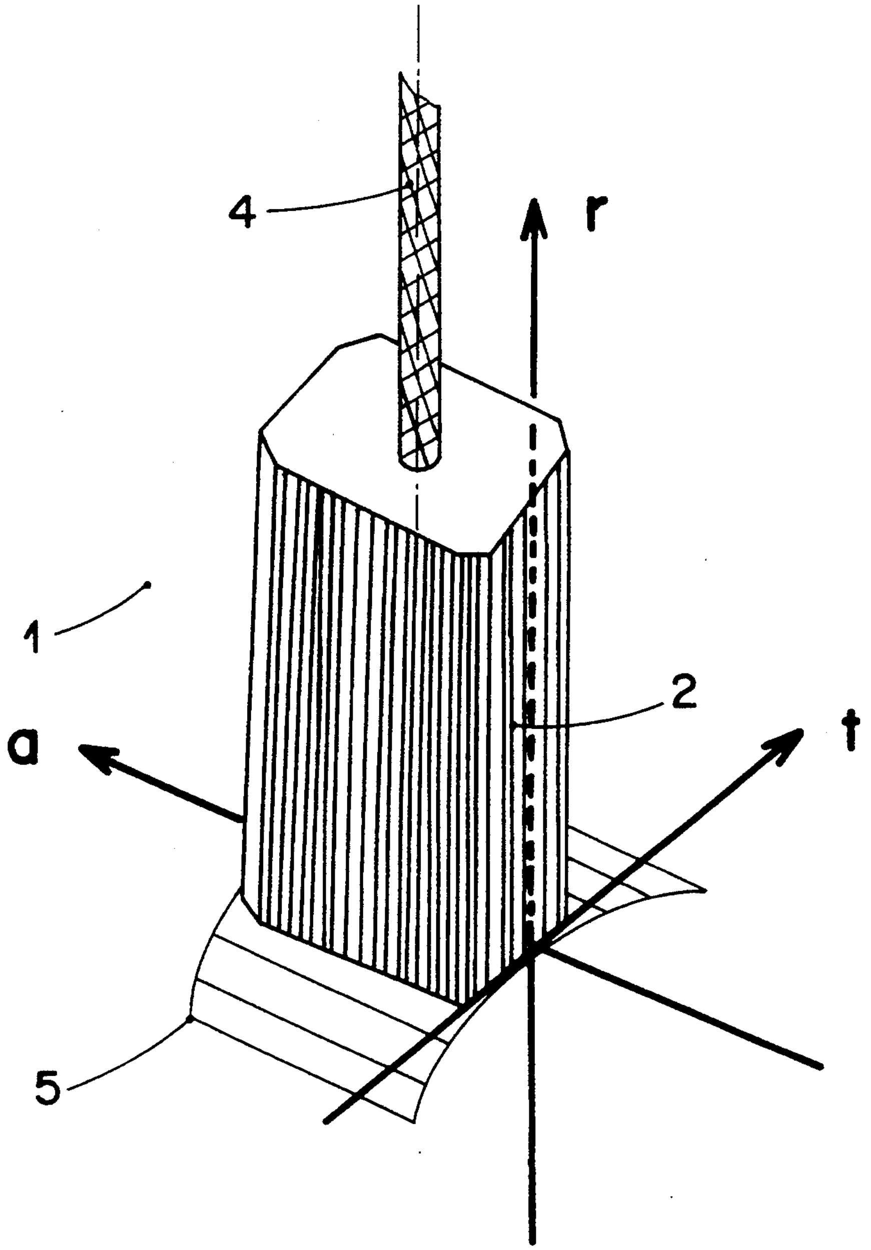
FIGS. 1*a* and 1*b* are perspective views of brushes according too the invention.
Figure 1B:
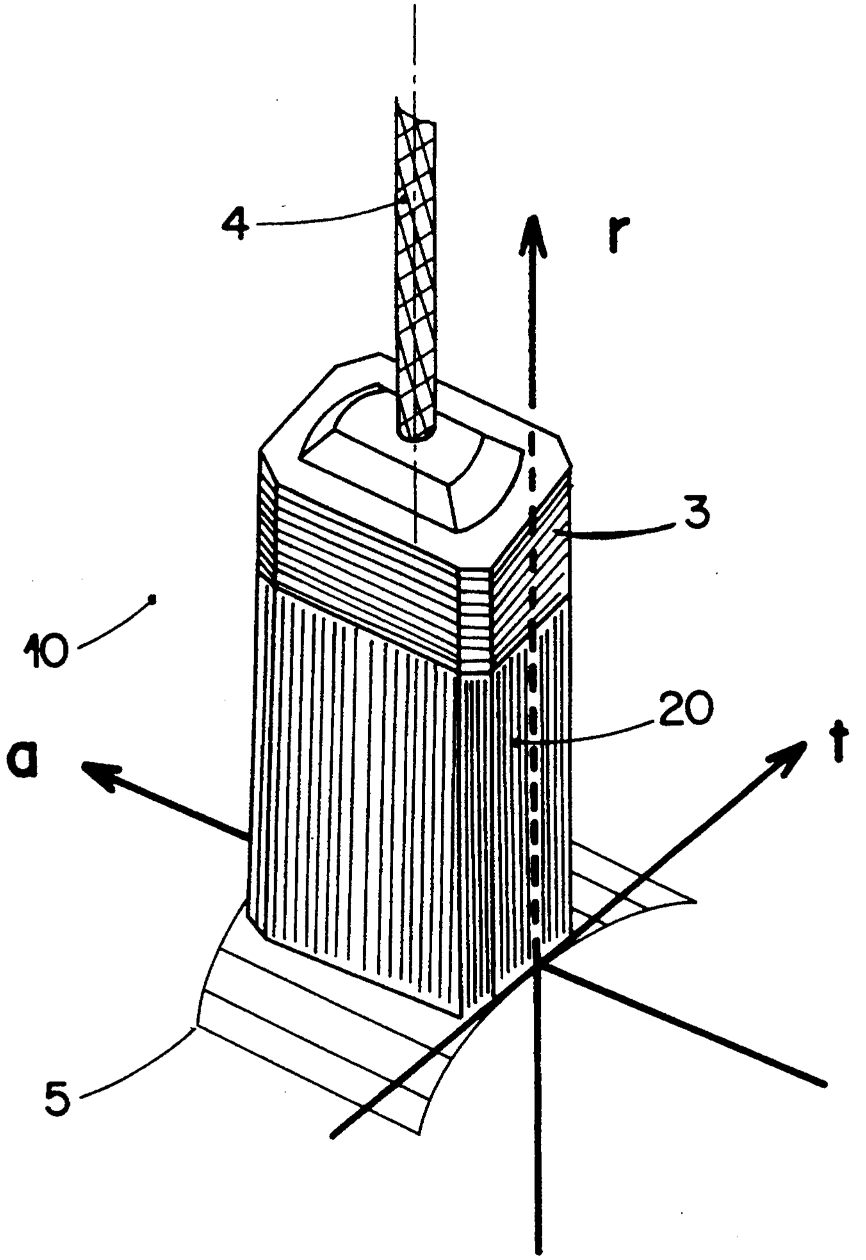

FIG. 1*a* shows single-layer brush 1 formed by a wearing block 2 and a copper braid 4 while FIG. 1*b* shows the multi-layer brush 10 of Example 1 according to the invention which is formed by a wearing layer 20, and a connecting layer 3 in which the copper braid 4 is anchored. The drawing shows the collector 5 and the standardised directions "a", "r" and "t".

Figure 2:
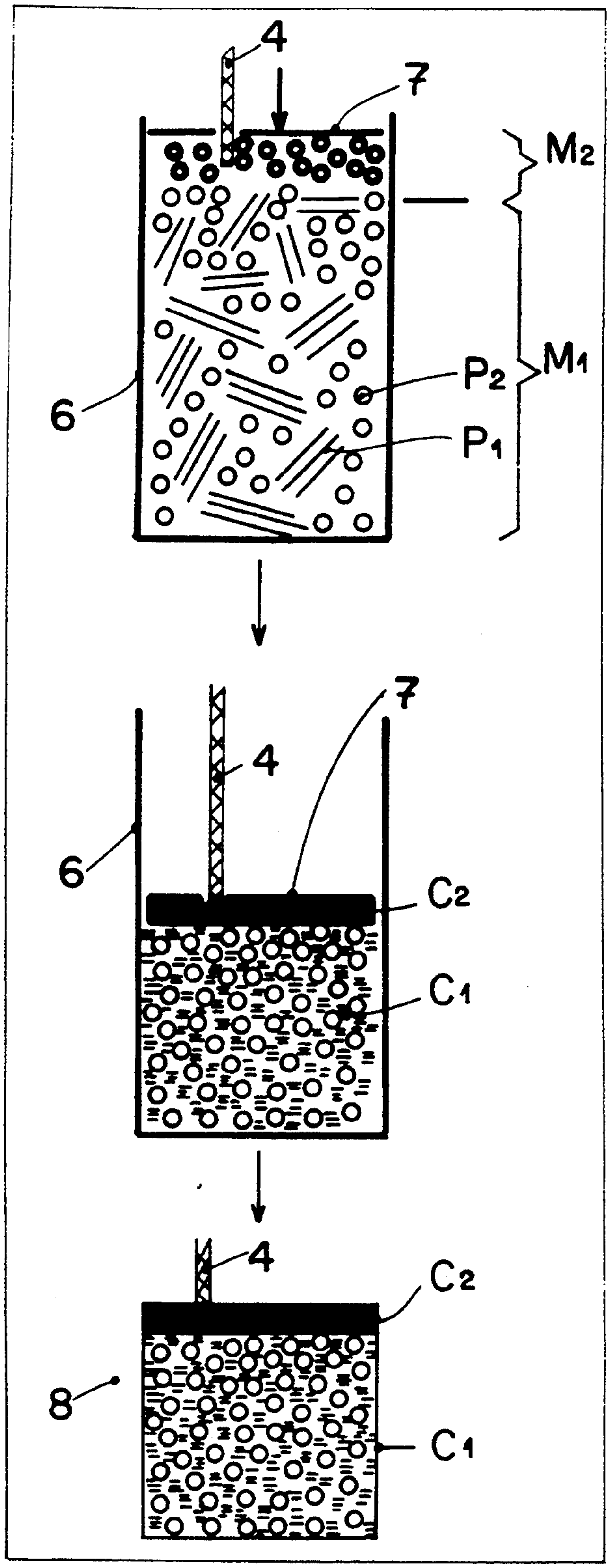
FIG. 2 is a schematic cross-sectional view of the compression process for production of a brush.

FIG. 2 is a diagrammatic view in section in the compression direction of the production of a rough multilayer brush 8 (layers C1 and C2) by compression in a mould 6 of a mixture M2 in which the braid 4 is incorporated and a mixture M1 of two powders P1 and P2 which respectively involve a high degree of slenderness and a low degree of slenderness, by means of a ram 7, and shows that the particles P1 in the form of flakes with a high degree of slenderness break when the compression effect occurs.

FIGS. 3*a*–3*b* and 3*c*–3*d* are views in section along two perpendicular axes of a typical particle of powder P1 and P2, respectively. The shape factor (slenderness) of a particle is the ratio D/d (larger dimension D/smaller dimension d).

Figure 4A:
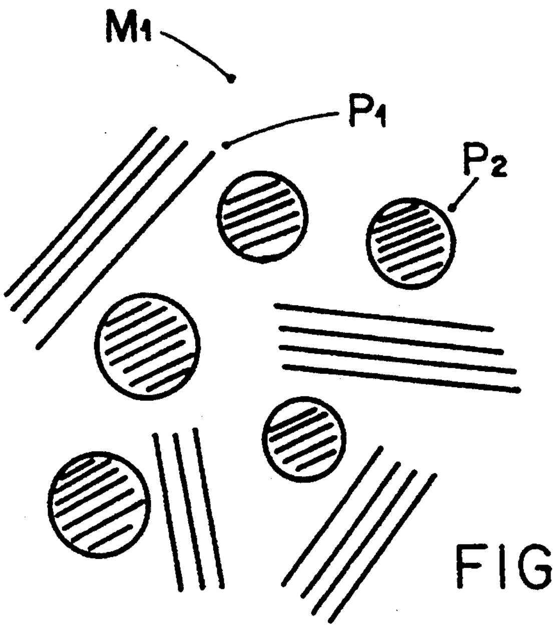
FIGS. 4*a* and 4*b* are sectional views of powder mixtures before and after compression, respectively.
Figure 4B:
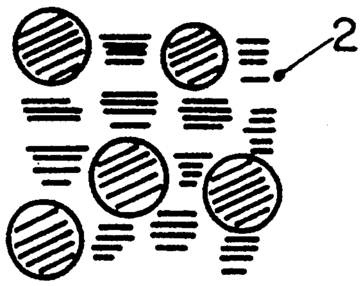

FIGS. 4*a* and 4*b* are a view (which is put into diagrammatic form from microphotographs) in section of the mixture M1 of powders P1 and P2 before and after compression respectively. Fragmentation of the particles P1 after compression is observed (the binder L is not shown in these FIGS.).

Figure 5:
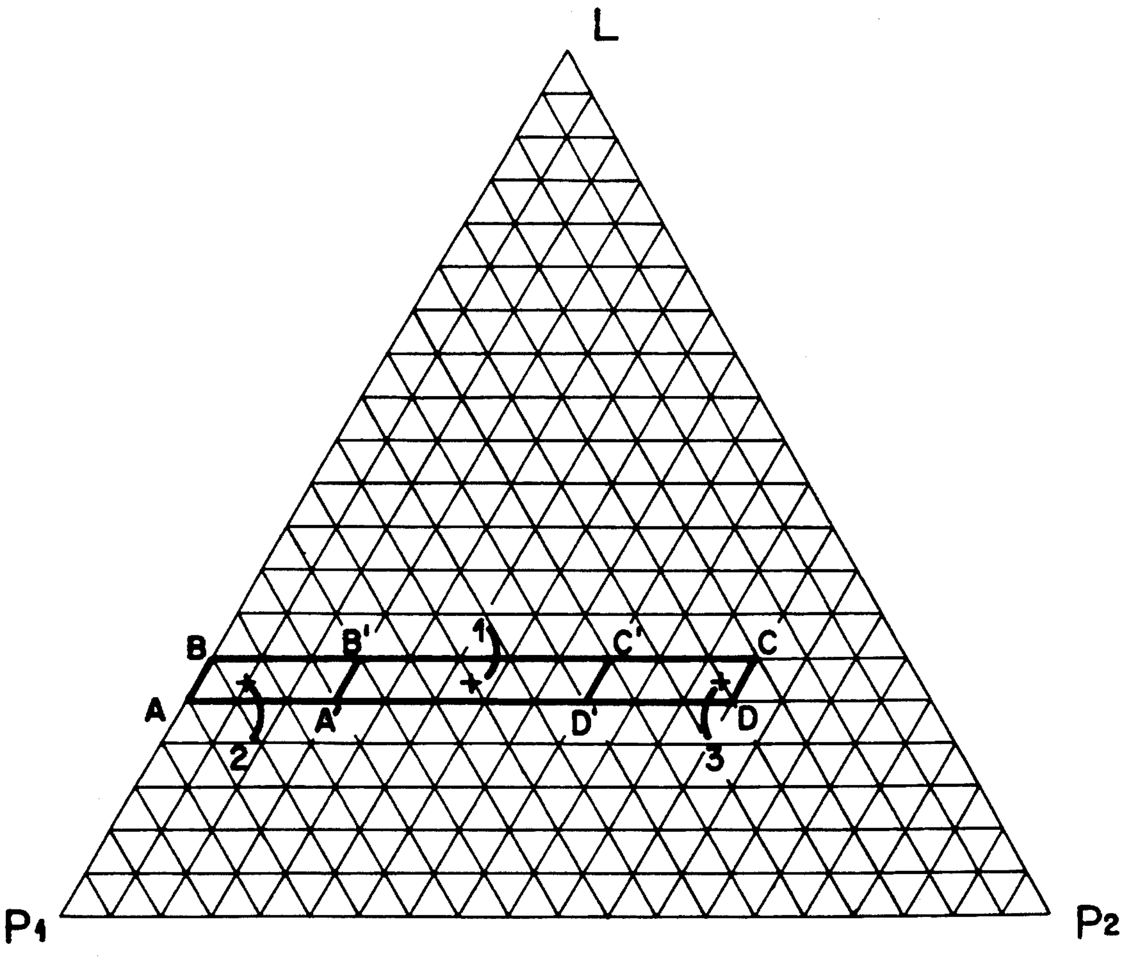
FIG. 5 is a diagram of the composition ranges of powder mixtures according to the invention.

FIG. 5 shows the range of composition by weight of the constituents of the mixture M1 according to the invention (parallelogram ABCD):

binder L: between 25 and 30%
powder P1 with a high degree of slenderness: between 15 and 75% and
powder P2 with a low degree of slenderness: between 0 and 55%.

FIG. 5 also shows the preferred range of the invention (parellelogram A'B'C'D'):

binder L: between 25 and 30%
powder P1: between 30 and 60% and
powder P2: between 15 and 40%.

DETAILED DESCRIPTION OF THE INVENTION

Although the essential means of the invention results from the choice of a powder P1 of particular morphology, the applicants observed that it was preferable to produce a wearing block 2 or a wearing layer 20 by compression of a mixture comprising said powder P1, said binder L and another graphite powder P2, which however is a powder formed by particles with a low degree of slenderness, with a low shape factor F2 of less than 3.

Indeed if the mixture of powder P1 and binder L according to the invention does in fact result in a brush which affords a response to the problem set and which is of the final dimensions, after baking, in accordance with the standards, it is nonetheless preferable for a graphite powder P2 with a low degree of slenderness to be mixed with the powder P1 both primarily to "harden" the brush and to reduce fouling of the collector and wear of the brushes.

Among all the possible compositions for the mixture M1 formed by three constituents L0 P1 and P2, which are shown in conventional manner on a triangle of which each apex (L, P1 and P2) corresponds to 100% of the corresponding constituent, the compositions according to the invention constitute a restricted range. As shown in FIG. 5 in a triangle with apexes L, P1 and P2, the range of the invention is the parallelogram ABCD and the preferred range of the invention is the parallelogram A'B'C'D'.

By way of example the coordinates/or compositions of the points A, B, C, D (% by weight, the total of which is equal to 100) is:

| | L | P1 | P2 |
|---|---|---|---|
| A | 25 | 75 | 0 |
| B | 30 | 70 | 0 |
| C | 30 | 15 | 55 |
| D | 25 | 20 | 55 |

All the morphological characteristics of the powders P1 and P2 and the delimitations relating to the composition result from the applicants' studies and constitute a selection of experimental conditions which make it possible to satisfy all of the following conditions:

the starting powders are inexpensive powders which do not necessitate particular treatments, which powders can be handled in accordance with the usual standards in the art, low degree of deformation of the brushes in the baking operation, and braid incorporated in the wearing block/in the connecting layer in the compression operation.

It will be appreciated moreover that the brushes obtained must have and do indeed have mechanical characteristics which correspond to the usual values.

By way of example if the relative proportion by weight of distillation binder L in the mixture M1 is too great (>30%), there is a risk of overwetting of the mixture M1 and cracking of the brush during the baking operation. If on the other hand it is too low (<25%) the solid particles (graphite powders P1 and P2) are not bound, and that is detrimental to the mechanical strength of the final brush (excessive fragility on the part of the brush) and gives rise to a high rate of Likewise as regards the relative proportion as between the two families of powders P1 and P2, if the amount of powder P1 is too low in relation to the amount of powder P2, excessive deformation in the baking operation is found to occur. In contrast, in the absence of powder P2, the brush obtained does indeed deal with the problem raised but, as already mentioned above, the applicants in that case observed faster wear of the brushes as well as a higher level of fouling of the collector.

For all those reasons the preferred range of composition of the invention is represented by the parallelogram A'B'C'D' corresponding to the following ranges (composition by weight):

L: from 25 to 30%

P1: from 30 to 60% and

P2: from 15 to 40%.

According to the invention the graphite powder P1 is preferably formed by flakes (particles with a marked bidimensional character) with a high degree of slenderness, a mean shape factor F1 of between 5 and 20 and a mean thickness of between 1 and 15 μm. Likewise the graphite powder P2 with a low degree of slenderness is preferably formed by grains (particles with a marked tridimensional character) with a mean shape factor F2 of close to 1 and with a mean diameter of between 10 and 200 μm and preferably between 30 and 100 μm.

It may be advantageous according to the invention to produce a multi-layer brush as shown in FIG. 1*b* in respect of a dual-layer brush which is formed by a wearing layer 20 and a connecting layer 3 in which said braid 4 is anchored, in particular to reduce the contact drop (due to the electrical contact resistance) between the braid and the remainder of the brush.

For that purpose step a) of the process according to the invention involves preparing two separate mixtures of powder, M1 and M2, M1 corresponding to the above-described mixture and M2 comprising a graphite powder, a copper powder and a synthetic binder, and step b) involves compressing a superposed arrangement of two layers, a lower layer formed by the mixture M1 of powders and an upper layer formed by the mixture M2, after having incorporated the end of said braid in said upper layer, in such a way as to produce a rough dual-layer brush formed by a "wearing" layer C1 and a "connecting" layer C2 in which said braid is anchored. Then after baking of the rough brush in step c), the result obtained is a brush which can be used without additional machining.

Preferably the mixture M2 comprises a graphite powder which is agglomerated by a synthetic binder and a copper powder in a proportion by weight of between 15 and 35%, the synthetic binder being selected from thermosetting resins and more particularly phenolic resins.

Having regard to the fact that the mixture M2 comprises a burdensome binder, it is advantageous to limit the amount of mixture M2 (with respect to the amount of mixture M1) to that which is strictly necessary to permit anchoring of the braid.

Typically the amounts of mixtures M1 and M2 are so selected as to produce after compression a rough multilayer brush in which said layer C2 in which said braid is anchored is of a height of between 2 and 10 mm, the height of said layers corresponding to the direction in which the mixtures are compressed in the mould. Usually the ratio "height of the layer C1/height of the layer C2" is generally between 2 and 30 and in most cases of the order of from 5 to 10. Thus, as may be seen, the very great majority of the material constituting the brush contains an inexpensive binder.

As regards the distillation binder of the wearing layer 20 or the wearing block 2, it is formed by the product of distillation of coal or petroleum or by a product derived from such a distillation product. In fact the binders which are obtained directly or even after transformation, by distillation of coal or petroleum, are inexpensive in comparison with synthetic binders (typically thermosetting resins of phenol, epoxy, etc. type . . . ).

However it may also be advantageous according to the invention to produce a single-layer brush formed by a single material not comprising any copper powder and which also makes it possible to achieve the aims of the present invention. In that case in step a) of the process of the invention the mixture M1 is worked with a solution in a solvent medium of a synthetic binder containing at least 25% by weight of non-dilute material and that mixing operation is continued to afford homogenisation of the mixture M1 and said solution in the solvent medium and elimination of the solvent from said solution.

Typically, incorporated into 90 parts of mixture M1 are 5 to 20 parts of synthetic binder (expressed in terms of non-dilute material). Preferably the amount of synthetic binder is between 7 and 12 parts and it is less by at least 50% than the amount of distillation binder L. The synthetic binder is preferably a phenolic resin and the solvent is preferably an alcohol. The amounts of synthetic binder (expressed in terms of non-dilute material) are so selected as to make it possible to produce a final inexpensive single-layer brush which is of the definitive dimensions on issuing from the baking operation and which has a sufficiently well-anchored braid 4. The amounts of solvent are so selected as to permit sufficiently fluid mixing to provide for homogenisation of the mixture M1 and the synthetic binder. This type of "single-layer" brush is substantially more economical than a "dual-layer" brush, having regard to its greater simplicity of manufacture, a single mixture of powders having to be prepared and manipulated, the amount of synthetic binder, although overall greater in a "single-layer" brush than that in a "dual-layer" brush, remaining very much less than the amount of distillation binder used—less by at least 50% of by weight.

Whether the brush is of the "dual-layer" or "single-layer" type, the process according to the invention is applied to the production of relatively slender brushes (high in relation to their section) and more particularly the production of brushes in which the slenderness factor p, which is defined by the ratio "height/square root of the section", is between 2 and 6. Those limits in regard to the slenderness factor p are based on the following findings: on the one hand, for $p<2$, the problem of the invention does not arise, as the degree of slenderness of the brush is too low, and on the other hand, for $p>6$, the slenderness of the brush being too high, there is a risk that the brush cannot be produced directly and reliably with the means according to the invention.

EXAMPLES

Example 1

The multi-layer brush shown in FIG. 1*b* was produced using the process diagrammatically shown in FIG. 2.

Step a):

The mixture M2 of the following composition by weight was prepared:

copper powder: 20 parts.

This commercial copper powder is formed by particles of a mean diameter of the order of 30 μm.

commercially available natural graphite powder agglomerated with phenolic resin: 80 parts.

The graphite powder is of type P1 (flakes) with a mean shape factor F1 of 8 and a mean thickness of the flakes forming the powder of 10 μm. The "graphite powder/phenolic resin" ratio by weight is 75/25.

The apparent density of the mixture M2 is 0.85.

Figure 3A:
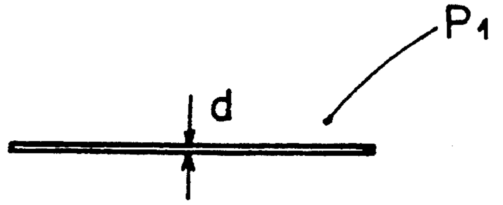
FIGS. 3*a*–3*b* and 3*c*–3*d* are sectional views of power particles.
Figure 3B:
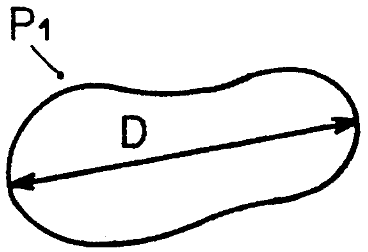
Figure 3C:
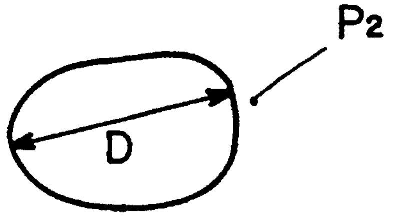
Figure 3D:
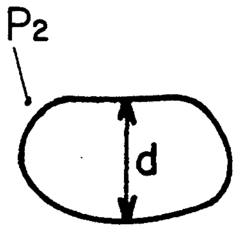

The mixture M1 of the following composition was prepared:

- powder P1: graphite powder (mixture substantially with equal parts of commercially available synthetic and natural graphite) formed by flakes of from 5 to 10 μm in thickness and with a large dimension of from 50 to 200 μm (see FIG. 3*a*).

The natural graphite used-is characterised by a mean flake thickness of 10 μm and a mean shape factor F1 of 8 while the artificial graphite used is characterised by a mean thickness of 5 μm and a shape factor F1 of 12.

- powder P2: commercially available artificial graphite powder of substantially spherical grains (shape factor close to 1) and with a mean diameter of 50 μm.
- distillation binder L: commercially available coal tar pitch.

The composition by weight of the mixture M1 is as follows:

- powder P1: 45%
- powder P2: 27.5%
- binder L: 27.5%

That composition corresponds to point 1 in FIG. 5. The apparent density of the mixture M1 is 0.75.

Step b)

This step involved filling a mould 6 of an internal section of 11×6 mm², the internal shape of which is deduced from FIG. 1*b*, by extending the direction "r". The mixture M1 was first introduced over a height of powder of 50 mm followed by the mixture M2 over a height of 10 mm.

The compression ram 7 carries a connecting braid 4.

The assembly of the mixtures of powders with the braid was compressed so as to produce the brush shown in FIG. 1*b* of a total height of close to 23 mm. The height of the layer C1 (compressed mixture M1) is 18.2 mm while that of the layer C2 (compressed mixture M2) is 4.8 mm. The density of the layer C1 is between 1.78 and 1.80 while that of the layer C2 is between 1.9 and 2.1.

Step c):

The compressed brush was baked at 600° C. in a non-oxidising atmosphere to prevent oxidation of the copper braid. In all the tests the composition by volume of the gaseous atmosphere was: 10% $H_2$–90% $N_2$.

The final dimensions of the brush are as follows:

- height (on the axis "r"): 23.11 mm
- length (on the axis "a"): 11.21 mm
- width (on the axis "t"): 6.23 mm Its slenderness factor p is $23.11/(11.21\times 6.23)^{\frac{1}{2}}$, namely 2.77.

For a brush carrier of a nominal internal section of 11.3 mm×6.3 mm ("a"×"t") and for a brush which is 23 mm in height (nominal value), the standardised tolerances in respect of "r", "a" and "t" are as follows:

- Height "r": 22.5–23.5 mm
- length "a": 11.26–11.17 mm
- width "t": 6.27–6.19 mm Results:

- on the one hand no considerable deformation of the brushes after baking was observed (no seriously unacceptable curvature of the brush along the axis "r"). The deformation observed is sufficiently slight (a few 1/100ths of sin) for the dimensions of the brush at the end of the baking operation to be within the tolerances.

The tests in respect of reproducibility of the process according to the invention were carried out on a sample of 100 brushes, taken from a production of 10,000 brushes.

Not only was it observed that, without additional machining, all the roughly moulded brushes satisfied the standards in regard to dimensions, but the narrowness of the dimensional ranges was also noted.

In fact the extents observed (extent in the statistical sense=maximum value−minimum value) on a batch of 100 brushes according to the invention are as follows:

- for the height (axis "r"): 0.52 mm
- for the length (axis "a"): 0.049 mm
- for the width (axis "t"): 0.046 mm.

If those values are compared to the dimensional tolerances (extents) in accordance with the standards already referred to:

- for the height (axis "r"): 1 mm
- for the length (axis "a"): 0.09 mm
- for the width (axis "t"): 0.08 mm it can be seen how much the process according to the invention is reproducible within narrow ranges, which constitutes a great advantage.

The additional tests and trials have shown on the one hand the very good mechanical strength of the connecting braid and on the other hand the excellent wearing properties of the brushes produced in accordance with the invention, in particular in the case of high-power domestic motors (power ranging from 500 to 1000 W or above) in which a low relative amount of wear of brushes has been observed.

Example 2

This Example involves producing brushes which are identical in all respects to those of Example 1 except that the composition of the mixture M1 used to form the layer C1 (20) is as follows (point 2 in FIG. 5):

powder P1: 67.5%
powder P2: 5%
binder L: 27.5%

After baking the brushes obtained are of dimensions which were within the standard, substantially like the brushes of Example 1.

However on a test bench those brushes showed a rate of wear which is slightly higher than that of the brushes of Example 1.

Example 3

Brushes identical in all respects to those of Example 1 were produced, except that the composition of the mixture M1 used to fore the layer C1 is as follows (point 3 in FIG. 5):

powder P1: 20%
powder P2: 52.5%
binder L: 27.5%

After baking brushes are obtained in which the dimensions were within the standard, but at the limit thereof, substantially like the brushes of Example 1.

Example 4

This Example involved producing brushes as shown in FIG. 1*a* which were identical in all respects to those of Example 1 except that only a single mixture M1 was prepared and the mixture M2 of Example 1 was replaced by the mixture M1.

The brushes obtained were similar to those of Example 1 as regards the dimensional properties but slightly inferior to those of Example 1 in regard to their wearing properties (higher electrical losses due to a higher level of contact resistance and hence a lower degree of durability).

Example 5

This Example involved producing brushes of the "single-layer" type in the following manner:

Step a):

firstly the mixture M1 of Example 1 was prepared, said mixture M1 and a 40% solution of phenolic resin in ethanol were then mixed. For 90 parts of mixture M1, this Example used 8 parts of phenolic resin (expressed in terms of non-dilute phenolic resin) and 12 parts of ethanol, all the parts being by weight, the mixing operation was continued to the state of total homogenisation and elimination of the alcohol by evaporation having regard to the heat given off by the mixing operation itself, so as to produce after cooling a powder which was ready for compression.

Step b):

The powder which was ready for compression was loaded into the mold of Example 1 over a height of 60 mm and then compressed to produce a height of close to 23 mm.

Step c) was carried out as in Example 1.

Results similar to those of the brushes of Example 1 were obtained.

Other tests:

All the tests carried out on the basis of a composition of mixture M1 which was outside the parallelogram ABCD either could not be obtained from the material point of view (for example due to the lack of binder L<25%) or were cracked (L>30% ) or were excessively deformed after baking (P2>55% for L of between 25 and 30%).

APPLICATIONS

The invention concerns in particular brushes for domestic appliances (suction cleaners, drilling machines . . . ), in particular high-power appliances (typically of 500 to 1000 W and more). It also concerns brushes of relatively short height, typically of the order of 15 mm, which are used in petrol pump motors.

ADVANTAGES OF THE INVENTION

The invention makes it possible to produce brushes of the "single-layer" or "dual-layer" type which, in the rough baked condition, are already of the definitive dimensions required and have a connecting cable or braid of copper or copper alloy, which avoids the need to pass the brushes through a finishing or machining shop.

In addition that result is achieved by means of standard tools for moulding brushes by compression and using for the very much greater part an inexpensive binder. The overall economic advantage is therefore very considerable and depending on circumstances is between 5 and 15% with respect to the comparable prior-art brushes, which is considerable for mass-consumption products, the economic advantage being more marked in the case of brushes of the "single-layer" type.

On the other hand, from a technical point of view, the "dual-layer" brush obtained in accordance with the invent ion has a particularly high level of performance and may be preferred to the "single-layer" brush depending on the level of requirements involved in use thereof. In fact in the case of a "dual-layer" brush the composition of the layer 3 which is intended to provide for anchoring of the braid 4 and in particular the combined use of synthetic resin and copper powder makes it possible at the seine time to achieve very good physical anchoring of the braid and in particular a low contact drop at the junction between the braid 4 and the connecting layer 3, being of the order of 1.5 mV, in comparison to that observed in the case of a junction between a braid 4 and a wearing block 2 (of the order of 50 mV). That could be due to the fact that, as has been observed, baking of a dual-layer brush according to the invention results in slight expansion of the layer C1 but slight contraction of the layer C2, hence giving rise to reinforcement of the anchoring of the braid in the layer C2 by compression of the material surrounding the braid 4.

What is claimed is:

1. A process for producing a brush for an electric motor of predetermined final dimensions comprising a wearing block and a connecting braid, comprising the steps of:

a) preparing at least one mixture comprising at least one conductive graphite powder in the form of solid particles of a mean thickness less than 25 μm and a mean shape factor greater than 5, encased with a distillation binder;

b) a molding said at least one mixture together with a connecting braid in a mold to form a crude brush of said final dimensions; and c) baking said crude brush.

2. A process according to claim 1 wherein said mixture comprises said power, said binder and a second powder with a mean shape factor less than 3.

3. A process according to claim 2 wherein said mixture comprises 15 to 75% by weight of said graphite powder 30 to 25% by weight of said binder and 0 to 55% by weight of said second graphite powder.

4. A process according to claim 3, wherein said mixture comprises 30 to 60% by weight of said graphite powder, 30 to 60% by weight of said binder and 15 to 40% by weight of said second graphite powder.

5. A process according to claim 2 wherein said second graphite powder is in the form of grains with a mean shape factor of close to 1.

6. A process according to claim 5, wherein said second graphite powder has a mean diameter of between 10 and 200 μm.

7. A process according to claim 6, wherein said second graphite powder has a mean diameter bewteen 30 and 100 μm.

8. A process according to claim 1 wherein said graphite powder is in the form of flakes, with a mean shape factor between 5 and 20 and of a mean thickness between 1 and 15 μm.

9. A process according to claim 1, additionally comprising in step a) preparing a second mixture comprising a graphite powder, a copper powder and a synthetic binder, and in step b), compressing a superposed arrangement of two mixture layers a lower layer formed from said at least one mixture and a upper layer formed from said second mixture, said braid being incorporated in said upper layer.

10. A process according to claim 9, wherein said second mixture comprises a graphite powder which is agglomerated by a synthetic binder and a copper powder in a proportion by weight of between 15 and 35%.

11. A process according to claim 10, wherein said synthetic binder is a phenolic resin.

12. A process according to claim 9, wherein the amounts of said mixtures are selected so as to product after compression a multi-layer brush in which said upper layer is of a height of between 2 and 10 mm, the ratio of height of said first layer/height of said second layer being between 2 and 30.

13. A process according to claim 12, wherein said brush has a slenderness factor between 2 and 6.

14. A process according to claim 1 wherein step distillation binder L is a product of distillation of coal or petroleum or is derived from such a product of distillation.

15. A process according to claim 11, additionally comprising in step a), mixing said at least one mixture with a solution of a synthetic binder containing at least 25% by weight of said binder in a solvent medium, continuing the mixing operation to homogenize said at least one mixture and said solution, and subsequently, eliminating said solvent.

16. A process according to claim 15, wherein from 5 to 20 parts by weight of said synthetic binder is incorporated in 90 parts by weight of said at least one mixture.

17. A process according to claim 16, wherein said synthetic binder is a phenolic resin and said solvent is an alcohol.

* * * * *

UNITED STATES PATENT AND TRADEMARK OFFICE
CERTIFICATE OF CORRECTION

PATENT NO. : 5,441,683

DATED : August 15, 1995

INVENTOR(S) : ERIC KAMMERER et al

It is certified that error appears in the above-identified patent and that said Letters Patent is hereby corrected as shown below:

Column 5, line 32, after "rate of" insert --wear--.

Column 7, line 35, before "copper" insert --*--;
line 37, before "commercially" insert --*--;
line 47, before "powder" insert --*--;
line 56, before "powder" insert --*--;
line 60, before "distillation" insert --*--.

Column 8, line 40, change "sin" to --mm--.

Claim 2, line 2, after "second" insert --graphite--.

Claim 4, line 3, change "60" to --25--.

Claim 9, line 5, after "layers" insert --,--.

Claim 15, line 1, change "11" to --1--.

Signed and Sealed this

Thirty-first Day of October 1995

Attest:

BRUCE LEHMAN

*Attesting Officer*

*Commissioner of Patents and Trademarks*